A. H. CARRILL.
RECORDING AND COMPUTING CARDS AND HOLDER THEREFOR.
APPLICATION FILED SEPT. 2, 1914.

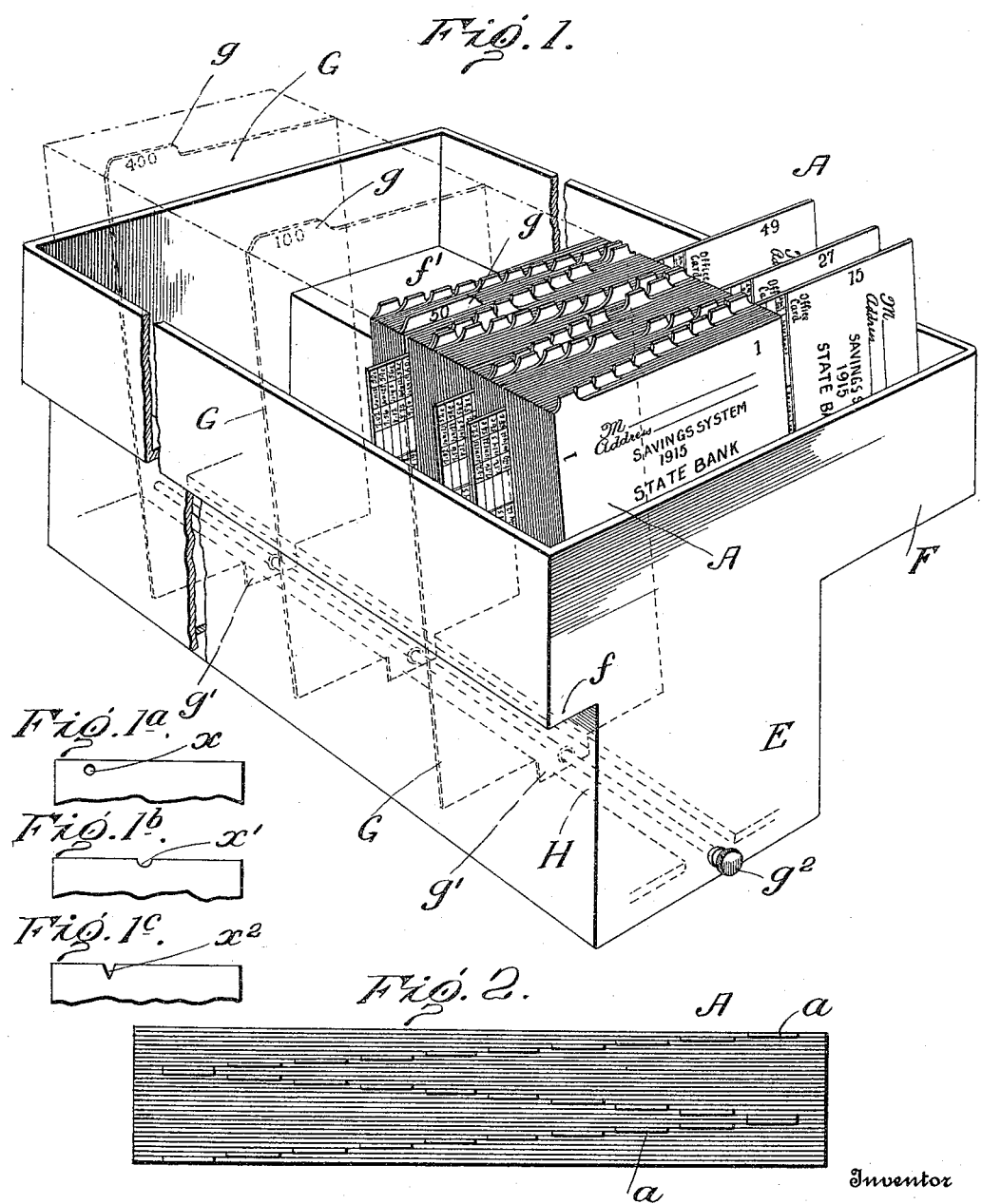

1,153,761.

Patented Sept. 14, 1915.
3 SHEETS—SHEET 2.

Fig. 3.

CLASS 2          50
M
Address
SAVINGS SYSTEM
1915
STATE BANK

Office Card

| AMT DUE | DATE DUE | AMT PAID | | RECORD OF PAYMENT MADE | | AMT PAID | DATE DUE | AMT DUE |
|---|---|---|---|---|---|---|---|---|
| 1.00 | Dec. 6 | | | Dec. 9 | Dec. 28 | 2c | Dec. 28 | 2c |
| 98c | Nov. 29 | 24.50 | | Nov. 29 | Jan. 4 | 6c | Jan. 4 | 4c |
| 96c | Nov. 22 | 23.52 | | Nov. 22 | Jan. 11 | 12c | Jan. 11 | 6c |
| 94c | Nov. 15 | 22.56 | | Nov. 15 | Jan. 18 | 20c | Jan. 18 | 8c |
| 92c | Nov. 8 | 21.62 | | Nov. 8 | Jan. 25 | 30c | Jan. 25 | 10c |
| 90c | Nov. 1 | 20.70 | | Nov. 1 | Feb. 1 | 42c | Feb. 1 | 12c |
| 88c | Oct. 25 | 19.80 | | Oct. 25 | Feb. 8 | 56c | Feb. 8 | 14c |
| 86c | Oct. 18 | 18.92 | | Oct. 18 | Feb. 15 | 72c | Feb. 15 | 16c |
| 84c | Oct. 11 | 18.06 | | Oct. 11 | Feb. 22 | 90c | Feb. 22 | 18c |
| 82c | Oct. 4 | 17.22 | | Oct. 4 | Mar. 1 | 1.10 | Mar. 1 | 20c |
| 80c | Sept. 27 | 16.40 | | Sept. 27 | Mar. 8 | 1.32 | Mar. 8 | 22c |
| 78c | Sept. 20 | 15.60 | | Sept. 20 | Mar. 15 | 1.56 | Mar. 15 | 24c |
| 76c | Sept. 13 | 14.82 | | Sept. 13 | Mar. 22 | 1.82 | Mar. 22 | 26c |
| 74c | Sept. 6 | 14.06 | | Sept. 6 | Mar. 29 | 2.10 | Mar. 29 | 28c |
| 72c | Aug. 30 | 13.32 | | Aug. 30 | Apr. 5 | 2.40 | Apr. 5 | 30c |
| 70c | Aug. 23 | 12.60 | | Aug. 23 | Apr. 12 | 2.72 | Apr. 12 | 32c |
| 68c | Aug. 16 | 11.90 | | Aug. 16 | Apr. 19 | 3.06 | Apr. 19 | 34c |
| 66c | Aug. 9 | 11.22 | | Aug. 9 | Apr. 26 | 3.42 | Apr. 26 | 36c |
| 64c | Aug. 2 | 10.56 | | Aug. 2 | May 3 | 3.80 | May 3 | 38c |
| 62c | July 26 | 9.92 | | July 26 | May 10 | 4.20 | May 10 | 40c |
| 60c | July 19 | 9.30 | | July 19 | May 17 | 4.62 | May 17 | 42c |
| 58c | July 12 | 8.70 | | July 12 | May 24 | 5.06 | May 24 | 44c |
| 56c | July 5 | 8.12 | | July 5 | May 31 | 5.52 | May 31 | 46c |
| 54c | June 28 | 7.56 | | June 28 | June 7 | 6.00 | June 7 | 48c |
| 52c | June 21 | 7.02 | | June 21 | June 14 | 6.50 | June 14 | 50c |

Witnesses
Helge Murray
M. E. Burrell

Inventor
Albert H. Carrill.
By Baldwin & Wight
Attorneys

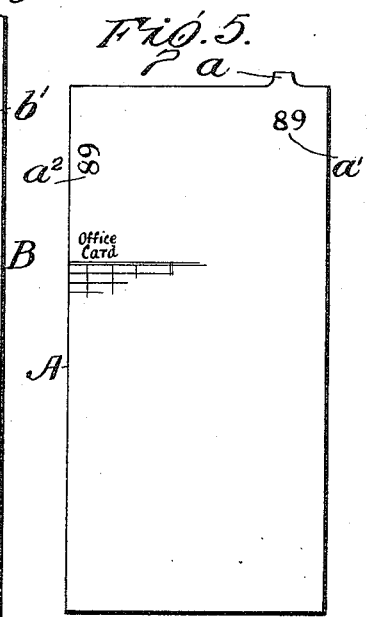
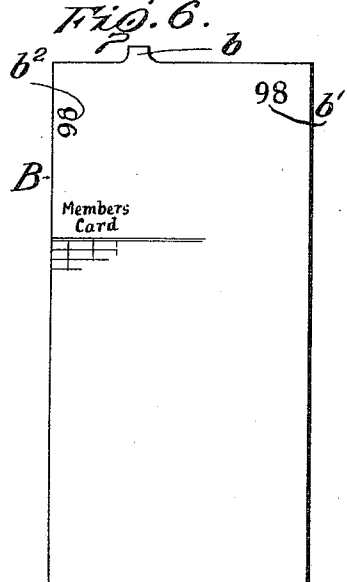

UNITED STATES PATENT OFFICE.

ALBERT H. CARRILL, OF BALTIMORE, MARYLAND, ASSIGNOR TO HART-KING SYSTEM COMPANY, OF BALTIMORE, MARYLAND, A CORPORATION OF MARYLAND.

RECORDING AND COMPUTING CARDS AND HOLDER THEREFOR.

1,153,761. Specification of Letters Patent. Patented Sept. 14, 1915.

Application filed September 2, 1914. Serial No. 859,914.

*To all whom it may concern:*

Be it known that I, ALBERT H. CARRILL, a citizen of the United States, residing in Baltimore, State of Maryland, have invented certain new and useful Improvements in Recording and Computing Cards and Holders Therefor, of which the following is a specification.

This invention relates to recording and computing cards of the kind used in savings systems. In such systems the cards are employed for recording payments made by the depositor who undertakes to deposit fixed sums at stated intervals for a predetermined time. Such cards are made to indicate the dates when payments are due, the amounts due on consecutive dates and the total amounts paid in on consecutive dates and in use the date when the last payment was made is usually punched so that the depositor and the bank can ascertain by merely glancing at the last date punched exactly how much has been previously deposited. Cards of this kind are extensively used for Christmas savings and the dates indicated on the cards are usually from a date immediately after Christmas day to a date immediately preceding the following Christmas, the dates being usually arranged to indicate weekly payments, say fifty in number.

My invention relates to recording and computing cards of this general class and my improved cards are primarily designed for Christmas savings, but may be used for other purposes.

In my system I use a card for each club member or depositor and a card for the bank or club office for each member. The member's card is suitably entitled and has spaces for the member's name and address and it is appropriately numbered at one corner of the top. The lower part of the front face of the card has on each side three vertical columns divided into sections and containing designations of dates when payments are due, the amounts due on said dates and the total amounts paid up to and including said dates. The columns on the right hand side of the card contain one-half of the spaces for the dates, amounts due, and the amounts paid, and these designations are horizontally arranged right side up of the card, while the remaining dates, amounts due, and amounts paid are printed wrong side up on the left hand side of the card. In this way the dates, etc., may be printed close to the two opposite edges of the card and the punching operation is thus facilitated.

The office card is the same in size as the member's card and contains the same arrangement of columns, figures and dates, so that when two cards of the same number are placed together with their edges registering, they may be simultaneously punched at the same point. In addition to the vertical columns at the edges of the card the office card contains two columns arranged midway between those first mentioned. These columns are divided into spaces in which dates are consecutively arranged, those on one side or in one column being printed right side up, while those in the other column are printed upside down. On opposite sides of these two intermediate columns are vertical columns containing blank spaces in which memoranda can be made. By this arrangement if the depositor makes payments in advance or pays more than is due at any time the exact amount paid may be entered while the total amount paid in may be indicated by a punch mark which will also indicate the date up to which payments are fully made.

Each card is provided with a tab at its upper end for convenience of handling while the cards are arranged in a case or drawer, and the tabs are so arranged on succeeding cards that when they are collected in a pack the tabs of several successive cards, say from one to ten, will be arranged diagonally crosswise of the pack, while the next set of cards will also have the tabs arranged diagonally crosswise of the pack but in an opposite direction. In this way the cards are so separated as to make it easy to withdraw any particular card. The office cards and the members' cards are consecutively numbered and the tab on each member's card is arranged in the same position as the tab on the correspondingly numbered office card, so that when the two cards are placed together the tabs precisely register, but if a member's card of one number is placed on a card of another number the error will be at once detected as the tabs will not register.

The office cards are held in a case or drawer of novel construction which has a compartment in which the cards are held in a pack vertically and another portion in which some of the cards may be held horizontally. Each office card has a number on its upper end disposed horizontally and another number disposed vertically so that the cards when disposed either vertically or horizontally may display their numbers in an upright position. For convenience I also employ spacing cards which are preferably permanently connected with the case. These may be arranged between each set of, say fifty, cards, or between any other suitable number of cards. These spacing cards have tabs bearing suitable numbers displayed above the pack of cards and such spacing cards may have tabs on their lower ends perforated to receive a locking rod so that the spacing cards may be thus permanently connected with the case or drawer but may be adjusted freely thereon.

In the accompanying drawings, Figure 1 is a perspective view showing a holder for a pack of cards made in accordance with my invention. Some parts are broken away and other parts are shown by dotted lines. Figs. 1$^a$, 1$^b$ and 1$^c$ show modified ways of providing the cards with devices for facilitating the matching of cards of the same number. Fig. 2 is a top plan view of a pack of cards showing particularly the arrangement of the tabs in the pack. Fig. 3 is a front face view of one of the office cards. Fig. 4 is a front face view of one of the member's cards. Figs. 5 and 6 are views of an office card and a member's card with most of the printed matter removed, these two figures being designed to illustrate how such numbers as 89 and 98, which are apt to be confused, are printed on cards with tabs differently arranged.

In my system I employ two sets of cards, one set consisting of cards A for the bank or club office, and one set consisting of cards B for the depositor or club member. Each member is assigned a certain number and each member retains his own card, while the bank or office retains all of the office cards. One of the members' cards is illustrated in Fig. 4. At its upper portion it is suitably entitled and it contains its number which as shown is printed twice on the card,—once horizontally as indicated at $b'$, and once vertically as indicated at $b^2$, but the number at $b^2$ may be omitted. Each member's card has a tab $b$. The lower portion of the card (preferably about two-thirds thereof) is divided near each side edge into three vertical columns entitled "Amt. paid," "Date due," and "Amt. due." In the drawings I have shown the vertical columns on the right hand side of the card divided into twenty-five spaces, each containing designations or money paid, or due, or dates when payments are due. These designations are printed right side up, while the dates, figures, etc., on the left hand side of the card are printed wrong side up. This facilitates punching the card on either side.

I have shown in Fig. 4 a card designed especially for use in a Christmas saving system, the dates running from December 28th to December 6th of the following year, and for example, I have indicated payments running from two-cents on the first week in arithmetical progression to one hundred cents, or one dollar on the last week, and I have also indicated the total amount paid in on the several dates. Other dates and figures may of course be used.

The office card is similar to the member's card in its arrangement at the top and at the opposite sides of its lower portion, but it contains in addition four vertical columns A, B, C, D. These columns are arranged intermediate the columns at the opposite side edges of the card. The two middle columns are entitled "Record of payment made". The column A contains designations of consecutive dates arranged right side up, while the column B shows consecutive dates arranged wrong side up. The spaces in the columns C and D are left blank and are used for making entries when payments are made, the exact amount paid being always entered in one of these columns. In this way if a member pays in advance for several weeks the exact amount paid may be entered opposite the date when the payment was made and the card may be punched opposite some subsequent date to indicate the total amount paid in by the member. Each office card is provided with a tab $a$ and with numbers $a'$ and $a^2$ arranged both horizontally and vertically like those in Fig. 4. I would say, however, that the members' cards do not necessarily contain vertically arranged figures, while the office cards preferably do contain such figures for a purpose hereinafter more fully explained. The tab $a$ on each office card should exactly register with a corresponding tab on the member's card of the same number. If the tab on an office card should not register with the tab on the member's card, the clerk will at once know that the cards are of different numbers.

A similar result might be obtained by using cards of the kinds indicated in Figs. 1$^a$, 1$^b$ and 1$^c$. In Fig. 1$^a$ the card is shown as being provided with a perforation or hole $x$, in Fig. 1$^b$ the card is provided with a curved notch $x'$, and in Fig. 1$^c$ the card is shown as being provided with an angular notch $x^2$. Various other devices of this sort might be used. The office cards and the members' cards should have corresponding notches, perforations or the like so that when cards of the same number are brought together these designating devices will register, but if cards of different numbers are brought together said devices will not register and the clerk will know that a mistake has been made.

The members' cards are, as before stated, retained by the members and when payments are made the members bring their cards to the office and have them punched. Before a member's card is punched the office card of the same number is placed upon it and the two cards are properly punched at the proper date or place. The numbers should, of course, precisely coincide and if any mistake is made the clerk will at once have his attention called to the mistake by reason of the fact that the tabs do not register.

The office cards are for convenience of handling kept in a case or drawer of novel construction. It comprises a compartment E in which the cards are arranged vertically in regular order and a compartment F in which the cards may be held horizontally. The cards are loose and may be easily withdrawn. The tabs project above the plane of the pack when in the compartment E and are disposed diagonally from side to side and rearward. This produces a zig-zag arrangement of tabs which facilitates the handling and withdrawing of the cards individually. I also preferably employ spacing cards G having tabs $g$. These cards are arranged between several sets of, say fifty, cards or any other suitable number of cards. The tabs $g$ are numbered, as shown, and these numbered tabs appear above the pack as illustrated in Fig. 1. In this way a card of any number may be easily found. It may be approximately located by means of the spacing cards and it can be easily selected by reason of the diagonal arrangement of the tabs above referred to. Tabs $g'$ project from the lower edges of the spacing cards and they are perforated to receive a locking rod $g^2$, which latter prevents the withdrawal of the spacing cards, but permits of their being moved back and forth and properly positioned in the case.

The compartment for holding the cards in a horizontal position comprises two supporting shelves $f$ and $f'$ in a plane above the compartment E and on opposite sides thereof. The width of the compartment F is approximately the same as the length of the cards so as to hold them in proper alinement.

By arranging appropriate cards horizontally the office clerk can distinguish the cards of one class of members from another, for instance, he can arrange horizontally the cards of all such members as are delinquent and the numbers of these cards are plainly displayed.

The manner of making entries, punching the cards, etc., has already been fully described. The cards are so made that the proper dates may be easily punched, liability of punching the wrong cards is remote, and the office is able to keep a correct record of the exact amount of all payments as made as well as to indicate the total amount paid up to any given date.

I claim as my invention:

1. A recording and computing card for savings systems having on each side of the front face thereof a set of columns divided into spaces containing designations of consecutive dates, amounts due on said dates, and amounts paid in on such dates, said designations of dates, amounts due and amounts paid being right side up on one side of the card and upside down on the other side thereof.

2. A recording and computing card for savings systems having on each side of the front face thereof a set of columns divided into spaces containing designations of consecutive dates, amounts due on said dates and amounts paid in on such dates, said card having on its upper portion a card number disposed horizontally and another card number disposed vertically whereby the number may be easily read when the card is in either an upright or horizontal position.

3. A recording and computing card for savings systems having on each side of the front face thereof a set of columns divided into spaces containing designations of consecutive dates, amounts due on the said dates, and amounts paid in on such dates, said designations of dates, amounts due and amounts paid being right side up on one side of the card and upside down on the other side thereof, said card having also columns in its middle portion containing designations of consecutive dates, and spaces opposite said dates for entries.

4. A recording and computing card for savings systems having on each side of the front face thereof a set of columns divided into spaces containing designations of consecutive dates, amounts due on the said dates and amounts paid in on said dates, and having also a middle set of columns containing designations of consecutive dates some of which are arranged right side up and others wrong side up and others of said intermediate columns having blank spaces for entries of amounts paid in on any particular date.

5. A holder for a pack of savings system cards, comprising a receptacle for holding the cards in an upright position and another receptacle above that first named and of greater width for holding the cards horizontally.

6. A holder for a pack of savings system cards, comprising a box having a lower receptacle of substantially the same width as the cards for holding them in an upright position and a receptacle of greater width above that first mentioned, a part of which
5 is disposed on one side of the first mentioned receptacle and the other part on the opposite side thereof.

In testimony whereof, I have hereunto subscribed my name.

ALBERT H. CARRILL.

Witnesses:
GERD BERGER,
WM. E. FREELAND.

Copies of this patent may be obtained for five cents each, by addressing the "Commissioner of Patents, Washington, D. C."